United States Patent [19]
Lambert

[11] 3,977,439
[45] Aug. 31, 1976

[54] SEALING ARRANGEMENT

[75] Inventor: Paul Lambert, Grenoble, France

[73] Assignee: Societe Generale de Constructions Electriques et Mecaniques (ALSTHOM), France

[22] Filed: Mar. 22, 1974

[21] Appl. No.: 453,860

[30] Foreign Application Priority Data
Mar. 22, 1973 France .............. 73.10341

[52] U.S. Cl. .................. 138/37; 138/114; 138/148; 176/50; 176/61; 277/53
[51] Int. Cl.² ............................ F15D 1/00
[58] Field of Search .......... 138/37, 40, 42, 44, 138/114, 148; 176/50, 61; 277/53, DIG. 8

[56] References Cited
UNITED STATES PATENTS

| | | | |
|---|---|---|---|
| 3,120,247 | 2/1964 | Volger | 138/148 |
| 3,158,543 | 11/1964 | Sherman et al. | 176/50 X |
| 3,235,465 | 2/1966 | McDaniel et al. | 176/61 |
| 3,401,081 | 9/1968 | Menzel et al. | 176/50 |

Primary Examiner—Jerry W. Myracle
Assistant Examiner—Charles Gorenstein
Attorney, Agent, or Firm—Craig & Antonelli

[57] ABSTRACT

A device intended for limiting leaks at the feet of the combustible elements of nuclear reactors constituted by a labyrinth seal placed in the space between the foot of the combustible element and its recess in a supporting plate, one point of the said space communicating by orifices with a reduced pressure zone of the heat-bearing fluid with said zone being formed by a narrowing in the cross-section of the element.

14 Claims, 4 Drawing Figures

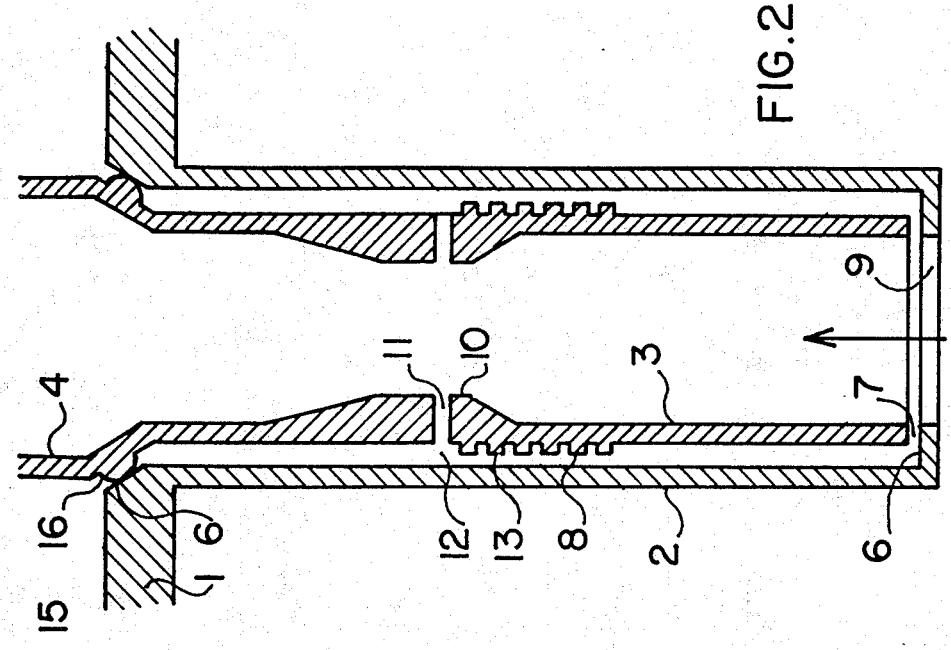
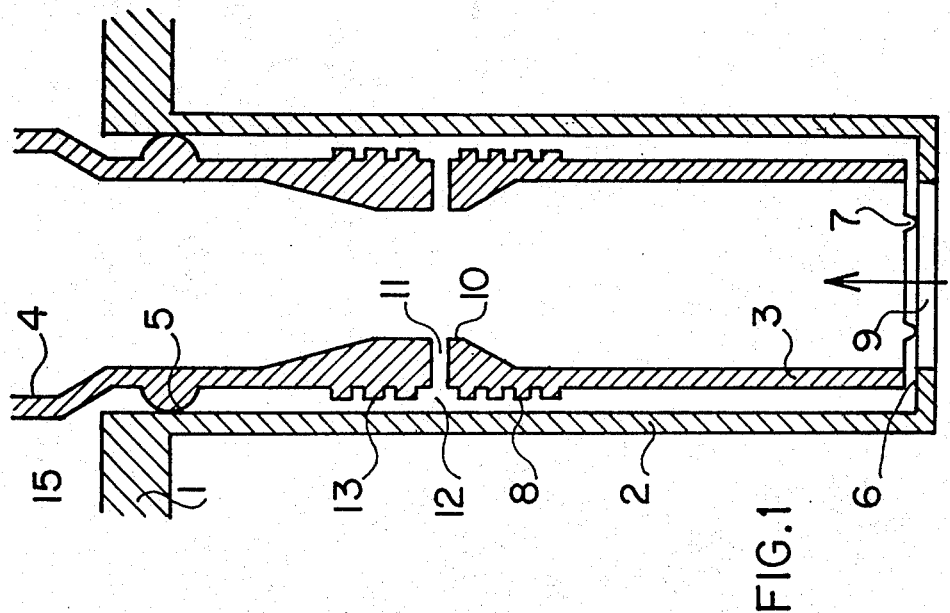

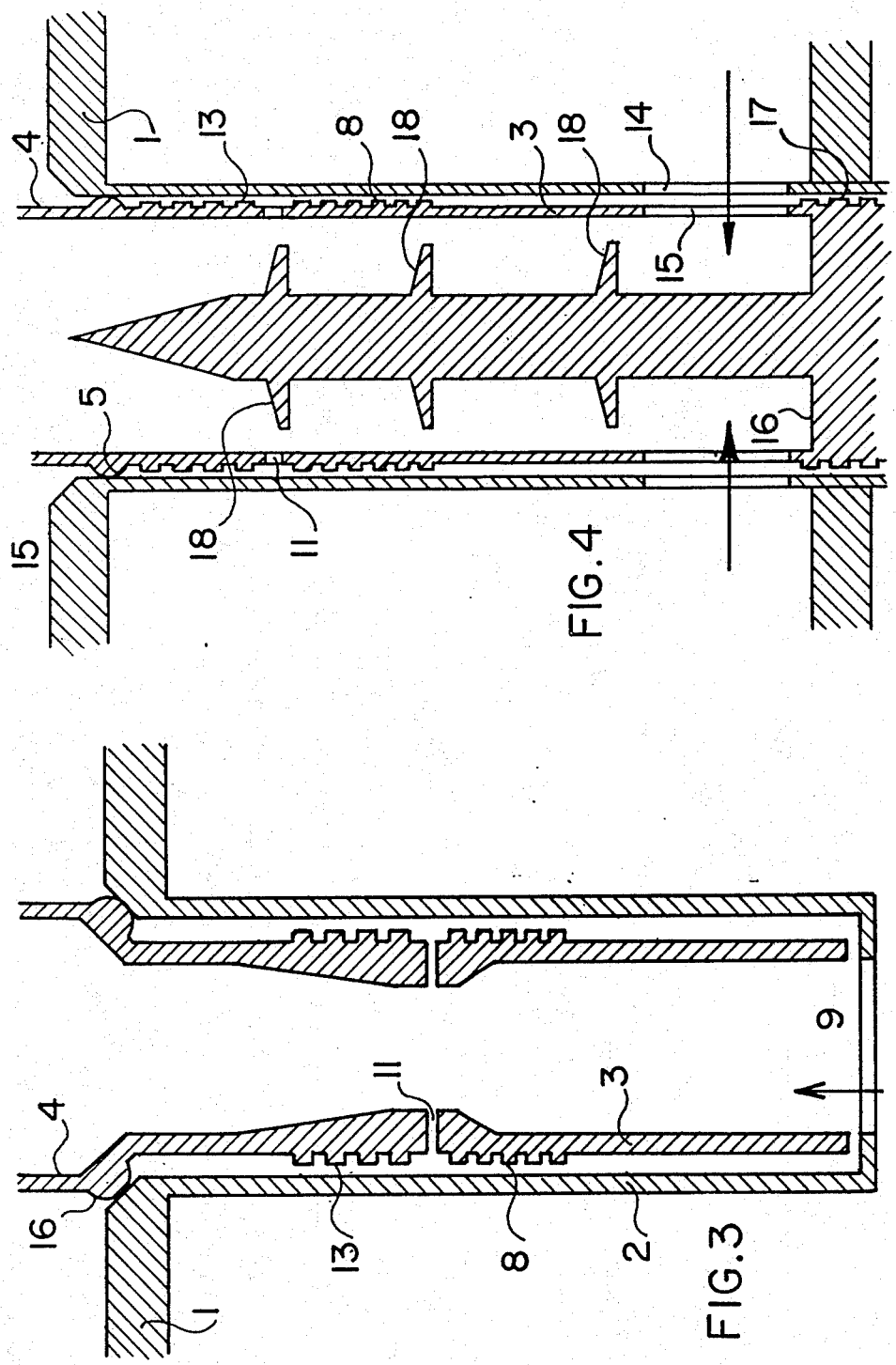

SEALING ARRANGEMENT

The vertical combustible elements of nuclear reactors are positioned on the bottom of the tank of the reactor, engaging their feet in recesses provided for that purpose in the said bottom, the elements being fed with heat-bearing fluid through the base of the feet.

Each foot is placed in its recess with clearance, to make the positioning easier. In order to ensure, despite this clearance, an accurate positioning of the elements, these elements are provided with a centering device. In known arrangements, there are two types of centering systems: (1) those which provide fluid-tight sealing by mechanical contact, and (2) those which do not provide fluid-tight sealing.

In the first case, fluid-tight sealing is never absolute and slight leaks occur, but under a high difference in pressure, this possibly gives rise to cavitation phenomena at the level of the centering device. A labyrinth seal, whatever its dimensions may be, would be ineffective for reducing the high difference in pressure under which that leak occurs, due to the fact that it has no effect on slight flows.

In the second case, an appreciable leak of heat-bearing fluid towards the tank tends to be set up through the space constituted by the clearance between the foot of an element and its recess, that leak possibly causing a reduction in the average temperature at the output of the reactor. The leak could not be sufficiently limited by the effect of a labyrinth seal for it would then be necessary to impart to the latter a length and clearance tolerances which are imcompatible with the geometrical characteristics of the installation, for example, height of the recess in the support plate and ease of handling for bringing the foot into its recess.

The present invention has for its object an arrangement consisting in providing a labyrinth seal in the space between the foot of an element and its recess, and in making a point of the space situated downstream from the beginning of the said labyrinth seal communicate with a zone formed by a narrowing in the cross-section of the passage inside the element foot.

The local reduction in pressure generated by the increase in the speed of the heat-bearing fluid in the narrowed cross-section causes a local reduction in the static pressure which is transmitted to the space between the feet and their recesses, causing the flow of a part of the leakage fluid towards the narrowed cross-section, thereby reducing the leak at the level of the centering device. The leakage flow directed towards the narrowed cross-section is thus recovered and is added to the normal flow of the heat-bearing which enters the vertical elements. The level of the pressure at the point where the communication orifices are situated will be chosen so that the difference in pressure in relation to the pressure in the tank be sufficient to avoid a possible return of fluid from the tank towards the orifices.

In the case of a fluid-tight centering device, the communication orifices could be placed immediately downstream from the labyrinth seal and virtually the whole of the leak through the labyrinth seal will return into the foot of the element through the orifices. In the case of a faulty positioning of the element, where fluid-tight sealing would then no longer be provided, or in the second case, where the centering system does not provide, by its structure, fluid-tight sealing, the communication set up downstream from the labyrinth seal would allow a great leakage to persist. It is then necessary, with a view to reducing that leakage, to place communication orifices in an intermediate part of the labyrinth seal, so that the loss of the pressure head due to the downstream part of the labyrinth have the effect of limiting that leakage towards the tank.

The characteristics and advantages of the invention will, moreover, become apparent from the following description of several embodiments given by way of examples.

FIG. 1 is an axial cutaway view of the foot of a combustible element of a nuclear reactor and of its recess with a non-fluid tight centering system;

FIG. 2 is an axial cutaway view of an embodiment with a fluid-tight centering system;

FIG. 3 is an axial cutaway view of a variation of FIG. 2; and

FIG. 4 is an axial cutaway view of a further embodiment of the invention.

FIG. 1 shows a support plate 1 and the recess 2 of the foot 3 of a combustible element 4. That element comprises a centering device constituted by three half-spherical bosses 5.

The foot 3 rests on the bottom 6 of the recess 2 by means of bearing stops 7 leaving a sufficient passage for the unavoidable leakage discharge brought in at that point and coming from the space below the support plate 1 to be unable to cause cavitation. A leakage limiting device constituted by a labyrinth seal 8, 13 downstream from the feed orifice 9 enables that discharge to be reduced.

Nevertheless, to limit sufficiently that discharge leakage, it would be necessary to make use of labyrinth seals whose length and clearance tolerances are incompatible with the geometrical characteristics of the installation, for example, height of the recess in the support plate and ease of handling to bring the foot into its recess.

In these conditions, the foot comprises, in the intermediate part of the labyrinth seal, between its elements 8 and 13, a narrowing of the cross-section 10 causing locally an increase in the speed of the heat-bearing fluid and a reduction in the pressure at that point.

Several orifices 11 communicate the space 12 between the foot and its recess with the narrowed cross-section 10 thus enabling a reduction in the pressure in the space 12 such that the flow of a part of the leakage discharge through the orifice 11 towards the narrowed cross-section is caused and consequently a decrease in the leakage at the level of the centering device 5 towards the enclosure 15 above the support plate 1 is achieved. That part of the leakage discharge which passes through the orifices 11 is used normally in the element 4.

In order to avoid any possibility of flow of fluid from the enclosure 15 towards the space 12, circumstances lead to the producing of the pressure-reducing system 10–11 so as to provide, at 12, a pressure greater than that prevailing in the enclosure 15. The part 13 of the labyrinth downstream from the orifice 11 is intended to reduce the leakage towards the enclosure 15 caused by that difference in pressure.

FIG. 2 shows an embodiment in which the centering device is constituted by a ring having a semi-circular cross-section 16 ensuring simultaneously sealing between the recess 2 and the enclosure 15 of the reactor. Nevertheless, such a fluid-tight sealing is never absolute and slight leakage could occur, which under too great a difference in pressure could cause cavitation in the interstices between the seal 16 and its seat 6.

Due to the fact that the leakages through the centering device are very slight, it is not possible to reduce them by means of a labyrinth seal, for these latter do not affect very slight flows. Thus, according to the invention, it is possible to place the communication orifices 11 immediately downstream from the labyrinth seal 8, 13 in order to reduce that difference in pressure and to avoid cavitation at the seal 16.

Nevertheless, the foot 3 of the element 4 may happen to be displaced in relation to its normal position in the recess 2, so that sealing will no longer be provided by the device 16. Under this circumstance, the embodiment in FIG. 3, consisting, as in FIG. 1, in placing the communication orifices 11 in the intermediate part of the labyrinth seal, between elements 8 and 13, is used. The device as a whole then operates like that in FIG. 1, when the device 16 no longer provides the intended fluid-tight sealing.

FIG. 4 shows an embodiment in which the feed orifice of the foot 3 of the element 4 is formed laterally, in the direction of the arrows, through orifices 19 and 20, so that the effect of the pressure affecting the bottom 21 of the foot prevents any danger of the rising of the element 4.

A labyrinth seal 17 provides a fluid-tight seal at the base of the foot 3.

That foot, as well as those in FIGS. 1, 2 and 3 may be provided with discharge regulating diaphragms 18. In that case, it is useful to take advantage of the depression thus set up to place the communication orifices 11 in the vicinity of one of these diaphragms 18.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What I claim is:

1. A sealing arrangement for tubular elements in a nuclear reactor comprising:
    fluid introducing support means for supporting an end portion of a tubular element and providing introduction of fluid into said tubular element,
    sealing means for preventing leakage of said fluid from said fluid introducing support means, said sealing means including
    a seal provided between said end portion of said tubular element and said fluid introducing support means, and
    at least one orifice means for communicating an interior portion of said tubular element with an exterior position of said tubular element which is supported by said fluid introducing support means, said interior portion having a reduced cross-section.

2. A sealing arrangement according to claim 1, wherein said seal is a labyrinth seal.

3. A sealing arrangement according to claim 2, wherein said orifice means opens out of said tubular element at an intermediate portion of said labyrinth seal.

4. A sealing arrangement according to claim 2, wherein said orifice means opens out of said tubular element at a portion of said tubular element downstream of said labyrinth seal in the direction from the introduction of said fluid into said tubular element.

5. A sealing arrangement according to claim 2, wherein said reduced cross-section of said interior portion is constituted by a flow regulating diaphragm provided within said tubular element, said orifice means opening into said interior portion near said flow regulating diaphragm.

6. A sealing system for tubular elements in a nuclear reactor comprising:
    at least one tubular means for containing the flow of a heat bearing fluid, said tubular means having an end portion,
    support means for vertically supporting said at least one tubular means in a nuclear reactor, said support means including a corresponding recess portion surrounding said end portion of said at least one tubular means,
    fluid introduction means for introducing said heat bearing fluid into said tubular means at said end portion, and
    sealing means for preventing leakage of said heat bearing fluid from said recess portion, said sealing means including
    a seal provided at said end portion of said tubular means in said recess portion, and
    at least one orifice communicating an interior portion of said tubular means with said recess portion, said interior portion having a reduced cross-section, thereby providing a zone of reduced pressure such that leaking fluid in said recess portion flows into said interior portion through said orifice.

7. A sealing system according to claim 6, wherein said seal is a labyrinth seal.

8. A sealing system according to claim 7, wherein said at least one orifice opens into said recess portion at an intermediate portion of said labyrinth seal.

9. A sealing system according to claim 7, wherein said at least one orifice opens into said recess portion at a position on said end portion of said tubular means downstream of said labyrinth seal in the direction from said fluid introduction means.

10. A sealing system according to claim 7, wherein said zone of reduced pressure is provided by a flow regulating diaphragm arranged in said interior portion of said tubular means, said at least one orifice opening into said tubular means near said flow regulating diaphragm.

11. A sealing system according to claim 6, wherein said support means supports a plurality of said tubular means with a plurality of corresponding recess portions.

12. A sealing system according to claim 6, wherein said tubular means includes centering means for centering said end portion within said recess portion.

13. A sealing system according to claim 12, wherein said centering means provides a further seal between said tubular means and said support means.

14. A sealing system according to claim 12, wherein said centering means allows fluid flow from said recess portion, and wherein said fluid flow is prevented by said sealing means.

* * * * *